(12) United States Patent
Zhu et al.

(10) Patent No.: US 11,003,185 B2
(45) Date of Patent: May 11, 2021

(54) METHOD AND APPARATUS FOR CALIBRATING A VEHICLE CONTROL PARAMETER, VEHICLE CONTROLLER AND AUTONOMOUS VEHICLE

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Qi Kong, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 181 days.

(21) Appl. No.: 16/265,766

(22) Filed: Feb. 1, 2019

(65) Prior Publication Data
US 2020/0103899 A1 Apr. 2, 2020

(30) Foreign Application Priority Data

Sep. 30, 2018 (CN) .......................... 201811161478.7

(51) Int. Cl.
*G05D 1/00* (2006.01)
*B60W 50/00* (2006.01)
(Continued)

(52) U.S. Cl.
CPC ........... *G05D 1/0088* (2013.01); *B60W 50/00* (2013.01); *G05D 1/0212* (2013.01);
(Continued)

(58) Field of Classification Search
CPC ................................................. G05D 1/0088
See application file for complete search history.

(56) References Cited

U.S. PATENT DOCUMENTS 7,991,550 B2 * 8/2011 Zeng ..................... G01S 13/931
701/301
8,437,970 B2 * 5/2013 Mayor ............... G01R 33/0035
702/92
(Continued)

FOREIGN PATENT DOCUMENTS

| JP | 2-077807 A | 3/1990 |
| JP | 10-297515 A | 11/1998 |
| JP | 2018-144703 A | 9/2018 |

*Primary Examiner* — Michael A Berns
(74) *Attorney, Agent, or Firm* — Seed IP Law Group LLP

(57) ABSTRACT

Embodiments of the disclosure disclose a method and an apparatus for calibrating a vehicle control parameter, an on-board controller, and an autonomous vehicle; one embodiment of the method comprises: executing a calibrating step in response to reaching a preset update condition, the calibrating step comprises: obtaining a current offset data set, wherein the current offset data in the current offset data set are determined in a period of time including a current time point; determining a current offset data reference value for characterizing a value feature of the current offset data set; and performing offset correction for the vehicle control parameter based on an offset between the current offset data reference value and a historical offset data reference value. This embodiment implements autonomous calibration of the vehicle parameter based on changes of vehicle offset, such that the vehicle may accurately follow a corresponding control indicator.

8 Claims, 9 Drawing Sheets

(51) Int. Cl.
*G05D 1/02* (2020.01)
*H04L 29/08* (2006.01)

(52) U.S. Cl.
CPC .............. *B60W 2050/0083* (2013.01); *B60W 2050/0089* (2013.01); *H04L 67/12* (2013.01)

(56) References Cited

U.S. PATENT DOCUMENTS

| | | | |
|---|---|---|---|
| 10,118,639 B2* | 11/2018 | Zhu | B62D 6/002 |
| 10,534,370 B2* | 1/2020 | Cavalcanti | G08G 1/04 |
| 2013/0197736 A1* | 8/2013 | Zhu | G05D 1/0088 |
| | | | 701/26 |
| 2015/0081156 A1* | 3/2015 | Trepagnier | G05D 1/0248 |
| | | | 701/26 |
| 2018/0186403 A1* | 7/2018 | Zhu | B62D 6/02 |
| 2018/0348775 A1* | 12/2018 | Yu | B60W 30/1882 |
| 2020/0103899 A1* | 4/2020 | Zhu | B60W 50/0098 |

* cited by examiner

METHOD AND APPARATUS FOR CALIBRATING A VEHICLE CONTROL PARAMETER, VEHICLE CONTROLLER AND AUTONOMOUS VEHICLE

TECHNICAL FIELD

Embodiments of the present disclosure relate to the field of automatic driving, specifically relate to vehicle control, and more particularly relate to a method and an apparatus for calibrating a vehicle control parameter, a vehicle controller and an autonomous vehicle.

BACKGROUND

In the field of automatic driving, autonomous control of a vehicle is generally done through a vehicle brain when the vehicle is in a self-driving state. Specifically, a control module in the vehicle brain may also generate a control instruction based on ambiance parameters collected by sensors and vehicle control parameters to thereby meet a corresponding control indicator, e.g., causing the vehicle to accurately follow a planning trajectory.

Therefore, the vehicle control parameters are fundamental for the control module to accurately follow a planned route.

However, in the prior art, calibration of the vehicle control parameters is usually carried out manually offline. For example, parameters such as zero drift numerical values of a vehicle steering wheel are manually collected at intervals.

SUMMARY

Embodiments of the present disclosure provide a method and an apparatus for calibrating a vehicle control parameter, a vehicle controller and an autonomous vehicle.

In a first aspect, an embodiment of the present disclosure provides a method for calibrating a vehicle control parameter, comprising: executing a calibrating step in response to reaching a preset update condition, the calibrating step comprising: obtaining a current offset data set, wherein current offset data in the current offset data set are determined in a period of time including a current time point; determining a current offset data reference value for characterizing a value feature of the current offset data set; and performing offset correction for the vehicle control parameter based on an offset between the current offset data reference value and a historical offset data reference value.

In some embodiments, executing the calibrating step in response to reaching a preset update condition comprises: executing the calibrating step in response to the determined current offset data reference value exceeding a steady-state error of a control algorithm for controlling a vehicle.

In some embodiments, the current offset data reference value is determined by: selecting a candidate current offset data from the current offset data set; determining a range of numerical value based on the candidate current offset data; and determining the candidate current offset data as the current offset data reference value in response to determining that a percentage of the current offset data included in the range over the current offset data set exceeds a preset percentage threshold.

In some embodiments, the current offset data reference value is determined based on a mean value of the current offset data included in the current offset data set.

In some embodiments, the offset data include an azimuth offset amount, the azimuth offset amount referring to a difference between a target azimuth and an actual azimuth at a sampling time point of collecting the offset data.

In some embodiments, the offset data include a lateral offset amount, the lateral offset amount referring to a distance between a vehicle body position and a vehicle target trajectory at a sampling time point of collecting the offset data.

In some embodiments, the method further comprises: performing steering control of a vehicle based on the offset-corrected vehicle control parameter.

In a second aspect, an embodiment of the present disclosure provides an apparatus for calibrating a vehicle control parameter, comprising a condition determining unit and a calibrating unit, wherein the condition determining unit is configured for invoking a calibrating unit in response to reaching a preset update condition, and the calibrating unit is configured for executing a calibrating step including: obtaining a current offset data set, wherein the current offset data in the current offset data set are determined in a period of time including a current time point; determining a current offset data reference value for characterizing a value feature of the current offset data set; and performing offset correction for the vehicle control parameter based on an offset between the current offset data reference value and a historical offset data reference value.

In some embodiments, the condition determining unit is further configured for invoking the calibrating unit in response to the determined current offset data reference value exceeding a steady-state error of a control algorithm for controlling a vehicle.

In some embodiments, a current offset data reference value is determined by: selecting a candidate current offset data from the current offset data set; determining a range of numerical value based on the candidate current offset data; and determining the candidate current offset data as the current offset data reference value in response to determining that a percentage of the current offset data included in the range over the current offset data set exceeds a preset percentage threshold.

In some embodiments, the current offset data reference value is determined based on a mean value of the current offset data included in the current offset data set.

In some embodiments, the offset data include an azimuth offset amount, the azimuth offset amount referring to a difference between a target azimuth and an actual azimuth at a sampling time point of collecting the offset data.

In some embodiments, the offset data include a lateral offset amount, the lateral offset amount referring to a distance between a vehicle body position and a vehicle target trajectory at a sampling time point of collecting the offset data.

In some embodiments, the apparatus further comprises: a steering control unit configured for performing steering control to a vehicle based on the offset-corrected vehicle control parameter.

In a third aspect, an embodiment of the present disclosure provides an on-board controller, comprising: one or more processors; storage means for storing one or more programs, wherein when the one or more programs are executed by the one or more processors, the one or more processors are caused to implement the method described according to the first aspect.

In a fourth aspect, an embodiment of the present disclosure provides an autonomous vehicle, comprising an on-board controller described according to the third aspect.

In a fifth aspect, an embodiment of the present disclosure provides a computer readable storage medium on which a computer program is stored, wherein the program, when being executed by a processor, implements the method described according to the first aspect.

The technical solution of calibrating a vehicle control parameter provided by the embodiments of the present disclosure implements autonomous calibration of a vehicle parameter based on changes of vehicle offset by performing a calibrating step when reaching a preset update condition and then performing offset correction for the vehicle control parameter based on an offset between the current offset data reference value and a historical offset data reference value, thereby enabling the vehicle to follow a corresponding control indicator more accurately.

BRIEF DESCRIPTION OF THE DRAWINGS

Other features, objectives, and advantages of the present disclosure will become more apparent through reading the detailed description of the non-limiting embodiments with reference to the drawings below.

DETAILED DESCRIPTION OF THE PREFERRED EMBODIMENTS

Figure 1:
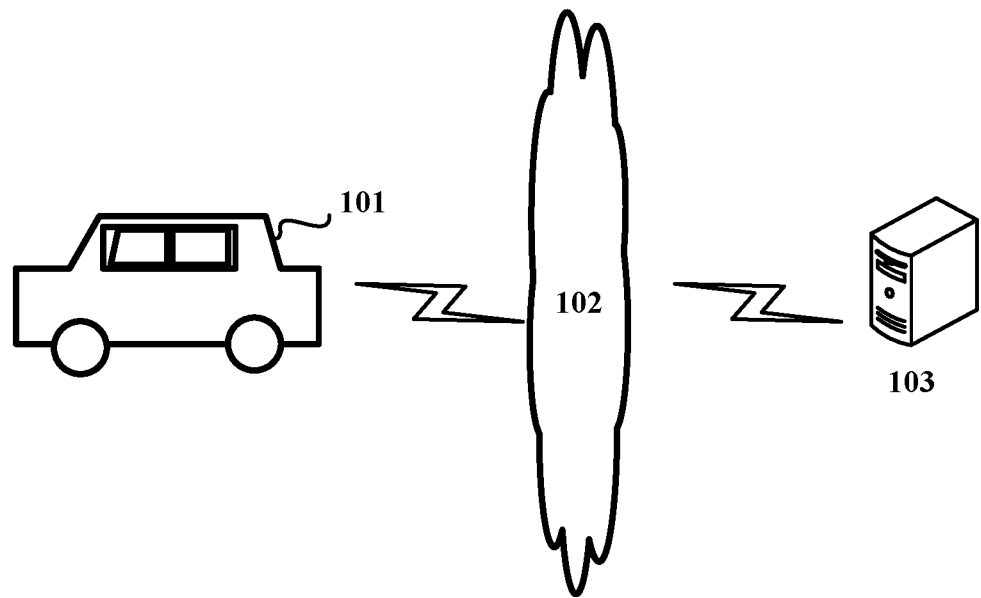
FIG. 1 is an exemplary system architecture diagram in which a method for calibrating a vehicle control parameter according to an embodiment of the present disclosure may be applied.

Hereinafter, the present disclosure will be described in further detail with reference to the accompanying drawings and the embodiments. It may be understood that the preferred embodiments described herein are only for illustrating the relevant invention, not for limiting the present disclosure. Additionally, it needs to be further noted that for the ease of depiction, only those parts related to the present disclosure are illustrated in the drawings.

Furthermore, it needs to be noted that without conflicts, the embodiments and the features in the embodiments of the present disclosure may be combined with each other. Hereinafter, the present disclosure will be described in detail with reference to the drawings in conjunction with the embodiments.

FIG. 1 illustrates an exemplary system architecture 100 in which embodiments of a method for calibrating a vehicle control parameter or an apparatus for calibrating a vehicle control parameter according to the present disclosure may be applied.

The system architecture 100 may comprise an autonomous vehicle 101, a network 102, and a server 103. The network 102 is configured as a medium for providing a communication link between the autonomous vehicle 101 and the server 103. The network 102 may have various connection types, e.g., a wired/wireless communication link or an optical fiber cable, etc.

The autonomous vehicle 101 may interact with the server 103 via the network 102 to receive or send messages, etc. Sensors like a vehicle mounted radar, processors such as a vehicle brain, and various communication devices may be installed on the autonomous vehicle 101.

The server 103 may be a server that provides various services, e.g., a server for processing the offset data collected by the autonomous vehicle 101. The server 103 may perform processing such as analyzing the received offset data, and return a processing result (e.g., a control signal of the autonomous vehicle) to the autonomous vehicle 101.

It needs to be noted that the method for calibrating a vehicle control parameter as provided by the embodiments of the present disclosure may be executed by the autonomous vehicle 101 or by the server 103, or partially executed by the autonomous vehicle 101 and partially executed by the server 103. Correspondingly, the apparatus for calibrating the vehicle control parameter may be provided in the server 103 or provided in the autonomous vehicle 103; or, part of the modules are provided in the server 103 while the remaining part are provided in the autonomous vehicle 101.

It should be understood that the numbers of autonomous vehicle 101, network 102, and server 103 in FIG. 1 are only schematic. Any number of autonomous vehicles 101, networks 102 and servers 103 may be provided according to implementation needs.

Figure 2:
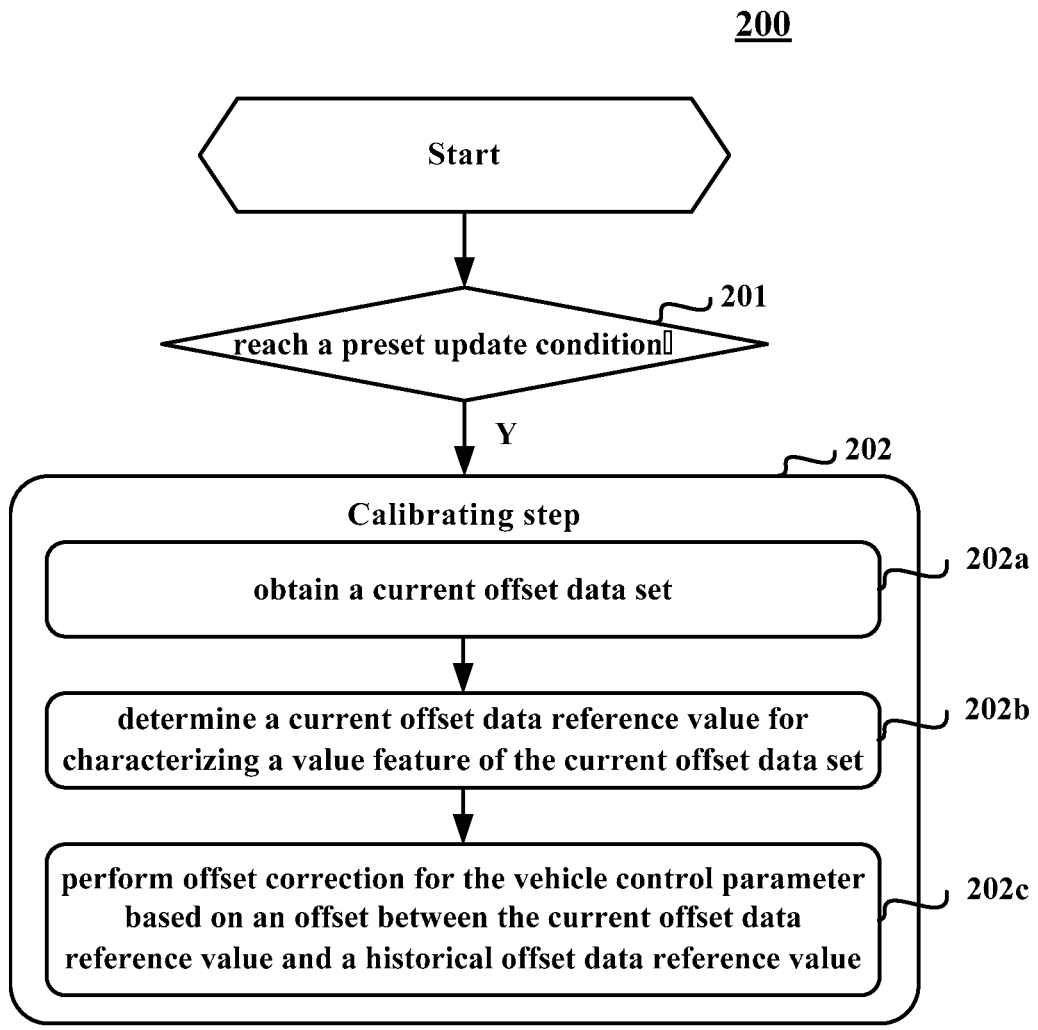
FIG. 2 is a flow chart of an embodiment of a method for calibrating a vehicle control parameter according to the present disclosure.

Now, continue to refer to FIG. 2, which shows a flow chart 200 of an embodiment of a method for calibrating a vehicle control parameter according to the present disclosure.

In various embodiments of the present disclosure, the vehicle control parameter may be any vehicle parameter that impacts a control signal outputted by any executing body (e.g., the autonomous vehicle 101 or server 103 as shown in FIG. 1) for controlling a vehicle to move and/or stop. In actual application scenarios, mounting positions of the IMU (Inertial Measurement Unit) and zero drift of the steering wheel all produce a certain impact on the vehicle control parameter.

Besides, the vehicle mentioned in various embodiments of the present disclosure may refer to an unmanned vehicle or a manned vehicle in a self-driving state.

The method for calibrating a vehicle control parameter, comprising:

Step 201: executing a calibrating step 202 in response to reaching a preset update condition.

Here, the preset update condition may be any feasible condition as preset.

For example, in some application scenarios, the vehicle may be calibrated once at preset intervals. Then, in these application scenarios, if a time gap between the current time point and the time point of last calibration reaches a preset time interval, it may be regarded as reaching the preset update condition.

Or, in some other application scenarios, it may be set to calibrate the vehicle after the vehicle has driven through a bumpy road segment. Then, in such application scenarios, if an ambiance collected by a sensor (e.g., a camera) of a vehicle indicates that the vehicle has driven through a bumpy road segment, it may be regarded as reaching the preset update condition.

Here, "calibration" may be understood as, for example, determining a current numerical value of the vehicle control parameter, or determining a change amount of the current value of the vehicle control parameter relative to the historical value.

The calibrating step 202 may further comprise:

Step 202a: obtaining a current offset data set, wherein the current offset data in the current offset data set are determined in a period of time including a current time point.

It may be understood that the current offset data set includes offset data determined at the current time point, as well as offset data determined in one or more certain historical time points before the current time point. For example, the current time point is 09:00:00 on Sep. 13, 2018; then the current offset data in the current offset data set may be a set including various offset data determined during the interval between 08:58:00 on Sep. 13, 2018 and 09:00:00 on Sep. 13, 2018.

Here, the offset data may be any data that may indicate an offset between an actual output and an expected output of the vehicle.

For example, in some application scenarios, at a certain time point, an acceleration of the vehicle collected by the sensor at the time point is $a_1$, while at this time point, the expected vehicle acceleration is $a_2$, then $a_1 - a_2$ may act as offset data.

Similarly, at a certain time point, a velocity of the vehicle collected by the sensor at the time point is $v_1$, while at this time point, the expected vehicle acceleration is $v_2$, then $v_1 - v_2$ may act as offset data.

At step 202b, a current offset data reference value for characterizing a value feature of the current offset data set is determined.

Here, the value feature may be understood as a feature that may characterize a commonness in various offset data among the current offset data set in terms of numerical value.

For example, in some application scenarios, the current offset data in the current offset data set are all in an interval [a, b]. Then, in these application scenarios, (a+b)/2 may be taken as a current offset data reference value for characterizing a value feature of the current offset data set.

At Step 202c, offset correction for the vehicle control parameter is performed based on an offset between the current offset data reference value and a historical offset data reference value.

In some application scenarios, offset correction for the vehicle control parameter may be performed based on an offset between a certain historical offset data reference value and the current offset data reference value. In such application scenarios, for example, the offset data reference value determined after the last execution the calibrating step may be used as the historical offset data reference value, and then offset correction for the current vehicle control parameter may also be performed based on the offset between the current offset data reference value and the historical offset data reference value.

Or, in some other application scenarios, offset correction for the vehicle control parameter may be performed based on offsets between a plurality of certain historical offset data reference values and the current offset data reference value. In such application scenarios, for example, historical offset data reference values determined by the previous n times of executing the calibrating step may be selected; a mean value or a weighted mean value of these historical offset data reference values may be used as a benchmark for comparing with the current offset data reference value, thereby performing offset correction for the current vehicle control parameter based on an offset between the current offset data reference value and the mean value or weighted mean value.

Figure 3:
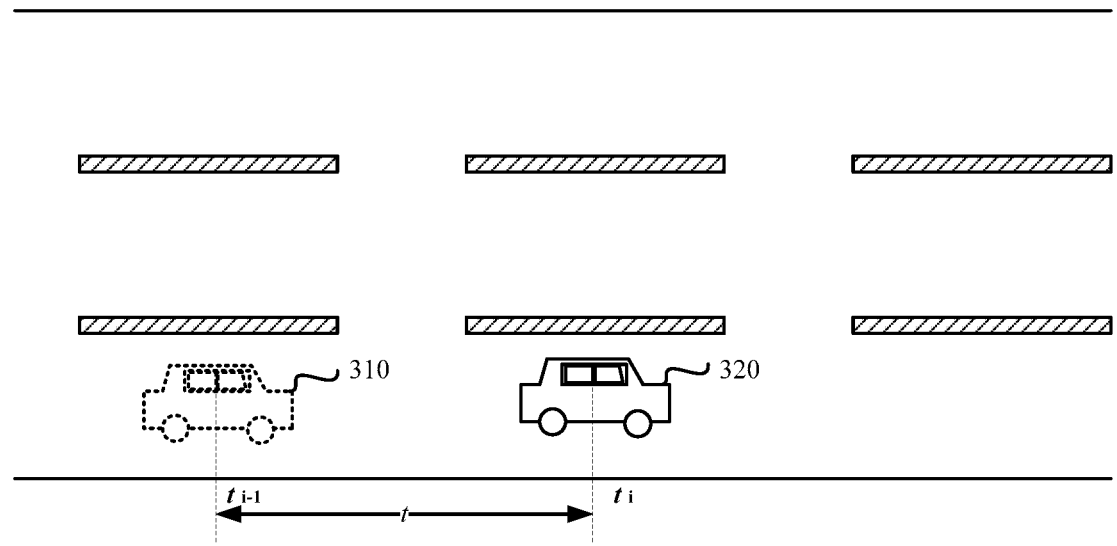
FIG. 3 is a schematic diagram of an application scenario for a method for calibrating a vehicle control parameter according to the present disclosure.

Continue to refer to FIG. 3, which shows a schematic diagram 300 of an application scenario for a method for calibrating a vehicle control parameter according to the present disclosure.

In the application scenario shown in FIG. 3, the interval for calibrating a control parameter of the vehicle may be preset to every t seconds.

Supposing at the time point $t_{i-1}$, the vehicle is shown by the reference numeral 310, and at the current time point $t_i$, the vehicle is shown by the reference numeral 320.

If the interval between the time point $t_i$ and the time point $t_{i-1}$ is t seconds and the calibrating step is executed for the vehicle control parameter at the time point $t_{i-1}$, then due to the interval t seconds between the current time point $t_i$ and the time point $t_{i-1}$ of last vehicle calibration, the current time point satisfies the preset update condition, and executing of the calibration step starts.

Specifically, the current offset data set may be first obtained. For example, current ambiance data may be collected using a sensor installed in the vehicle to thereby determine the offset data. Moreover, the offset data collected at each sampling time point may be stored in association with its sampling time point. In this way, when obtaining the current offset data set, at least part of the stored offset data may be selected to form the current offset data set.

Next, a current offset data reference value for characterizing a value feature of the current offset data set is determined.

Then, offset correction for the vehicle control parameter is performed based on an offset between the current offset data reference value and the historical offset data reference value.

In this way, by comparing the offset between the historical offset data reference value and the current offset data reference value and performing offset correction for the vehicle control parameter based on the offset, adverse impacts on control outputs of the vehicle due to drift and change of the vehicle control parameter may be mitigated, such that the vehicle may better follow the corresponding control target.

In some optional implementation manners of the method for calibrating a vehicle control parameter according to the present embodiment, the step 201 of executing the calibrating step in response to reaching a preset update condition may further comprise:

executing the calibrating step in response to the determined current offset data reference value exceeding a steady-state error of a control algorithm for controlling a vehicle.

The steady-state error ($e_{ss}$) may be understood as a difference between an expected steady-state output amount and an actual steady-state output amount. If the current offset data reference value exceeds a steady-state error of a control algorithm for controlling the vehicle, it may be regarded that a relatively large offset exists between the current actual output and the expected output of the vehicle.

At this point, the vehicle parameter may be re-calibrated to expect that a more accurate vehicle parameter enables the actual output to follow the expected output as much as possible.

For example, in some application scenarios, the expected acceleration of the vehicle is $a_1$ and the steady-state error is $\Delta a$. If the current vehicle acceleration is $a_2$, then the current offset data reference value is $|a_2-a_1|$. If $|a_2-a_1|>\Delta a$, it may be regarded that the current offset data reference value $|a_2-a_1|$ exceeds the steady-state error $\Delta a$ of the control algorithm for controlling the vehicle. At this point, to make the actual acceleration of the vehicle follow the expected acceleration as much as possible, the vehicle parameter may be re-calibrated to expect that a more accurate vehicle parameter enables the actual output to follow the expected output as much as possible.

Figure 4:
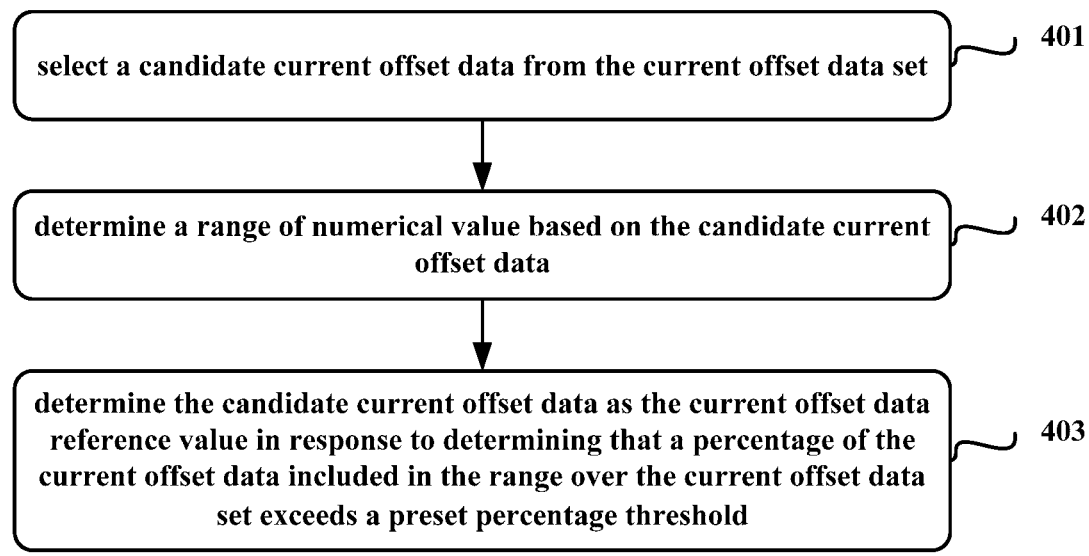
FIG. 4 is a schematic flow chart of an optional implementation manner of determining a current offset data reference value.

In some optional implementation manners of the present embodiment, the current offset data reference value may be determined using the flow 400 shown in FIG. 4.

Specifically, firstly, in step 401, a candidate current offset data is selected from the current offset data set.

Next, in step 402, a range is determined based on a numerical value of the candidate current offset data.

Then, in step 403, the candidate current offset data is determined as the current offset data reference value in response to determining that a percentage of the current offset data included in the range over the current offset data set exceeds a preset percentage threshold.

In these optional implementation manners, for example, a preset amount $\sigma$ and a percentage threshold $\lambda$ may be preset; and a current offset data satisfying the following relational expression (1), which may be found from the current offset data set using a search algorithm, is taken as the current offset data reference value.

$$P(e_{li}\pm\sigma)>\lambda \tag{1}$$

Figure 5:
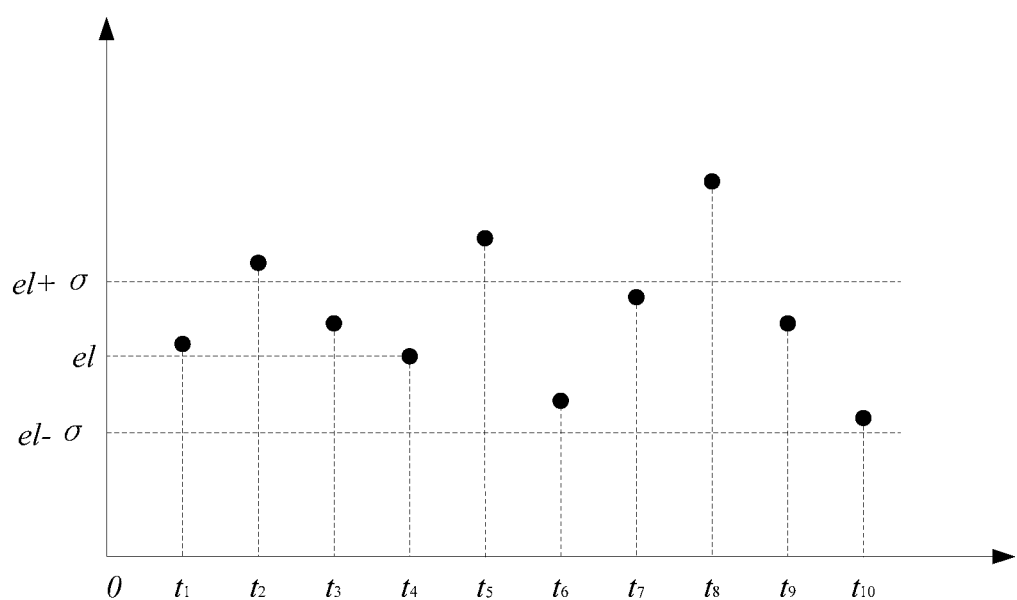
FIG. 5 is a schematic diagram of a current offset data set and a current offset data reference value determined from the current offset data set.

In some application scenarios, as shown in FIG. 5, the current offset data set $E1=\{e_{li}|i=1, 2, \ldots, 10\}$ includes 10 offset data, and it is preset that $\sigma=60\%$.

By leveraging a search algorithm, it may be determined that the range $[e_l-\sigma, e_l+\sigma]$ determined based on the $4^{th}$ current offset data $e_{l4}$ includes 7 current offset data in the current offset data set. Namely, the percentage of the current offset data in the range $[e_l-\sigma, e_l+\sigma]$ over the current offset data set is $7/10\times100\%=70\%>\lambda$. Therefore, the $4^{th}$ current offset data in the current offset data set (i.e., the current offset data $e_l$ determined at the $t_4$ time point) may be taken as the current offset data reference value.

It may be understood that in some application scenarios, when determining the current offset data through the steps 401~403, if the current offset data reference value is determined by traversing each current offset data in the current offset data set, then the current offset data set may have more than one current offset data satisfying the relational expression (1). In this case, the current offset data with the largest $P(eli\pm\sigma)$ among the plurality of current offset data satisfying the relational expression (1) may be taken as the current offset data reference value.

For example, in the current offset data set, there exist two current offset data $e_m$ and $e_n$ which both satisfy the relational expression (1), $P(em\pm\sigma)>P(en\pm\sigma)$, then the current offset data $e_m$ may be determined as the current offset data reference value.

In some other optional implementation manners of this embodiment, the current offset data reference value may also be determined based on a mean value of the current offset data included in the current offset data set.

For example, the current offset data set $E=\{e_i|i=0, 1, \ldots, T\}$. Then the current offset data reference value $\bar{e}$, for example, may be:

$$\bar{e} = \frac{\sum_{i=0}^{T} e_i}{T} \tag{2}$$

It may be understood that the historical offset data reference value may also be determined by either of the above described two manners. Besides, the manner of determining a historical offset data reference value may be identical to or different from the manner of determining the current offset data reference value.

For example, if the historical offset data reference value is determined based on the mean value of various historical offset data in the historical offset data set, the current offset data reference value may be determined based on the mean value of various current offset data in the current offset data set, or determined according to the flow shown in FIG. 4.

Similarly, if the historical offset data reference value is determined through the flow of FIG. 4, the current offset data reference value may be determined based on the mean value of various current offset data in the current offset data set, or determined according to the flow shown in FIG. 4.

Figure 6:
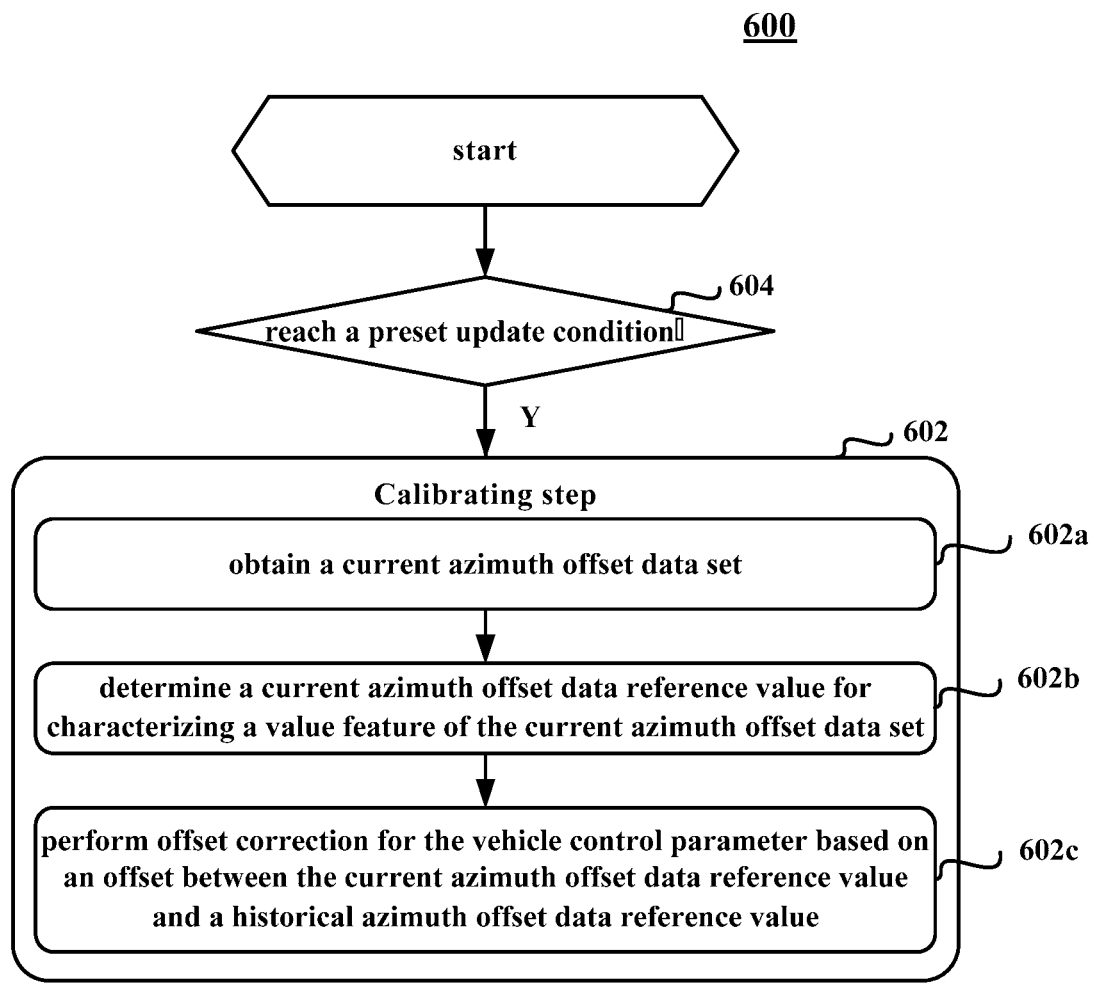
FIG. 6 is a flow chart of another embodiment of a method for calibrating a vehicle control parameter according to the present disclosure.

Now, continue to refer to FIG. 6, which shows a flow chart 600 of another embodiment of a method for calibrating a vehicle control parameter according to the present disclosure. In this embodiment, the offset data include an azimuth offset amount; The flow 600 of the method for calibrating a vehicle control parameter, comprising:

Step 601: executing a calibrating step 602 in response to reaching a preset update condition.

This step may be implemented in a manner similar to step 201 of the embodiment shown in FIG. 2, which will not be detailed here.

The calibrating step 602 may further comprise:

Step 602a: obtaining a current azimuth offset data set, wherein the current azimuth offset data in the current azimuth offset data set are determined in a period of time including a current time point.

Step 602b: determining a current azimuth offset data reference value for characterizing a value feature of the current azimuth offset data set.

Step 602c: performing offset correction for the vehicle control parameter based on an offset between the current azimuth offset data reference value and a historical azimuth offset data reference value.

Figure 7:
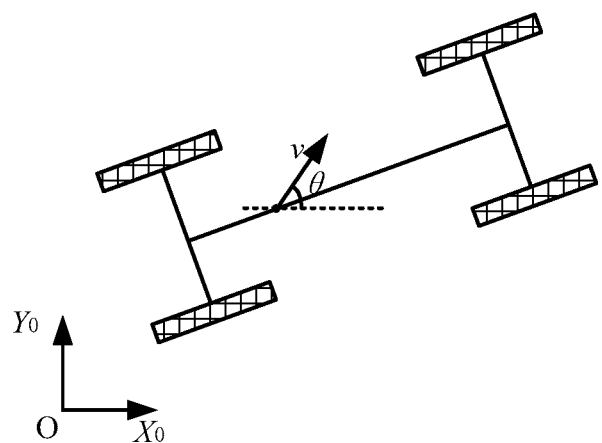
FIG. 7 is a schematic diagram of a vehicle azimuth.

As shown in FIG. 7, the azimuth angle is an included angle $\theta$ between the velocity v of the mass center of the vehicle and the transverse axis $OX_0$ in the ground coordinate system $X_0Y_0O$.

In this embodiment, by performing offset correction to the vehicle control parameter based on the offset of the azimuth offset amount, control accuracy of the lateral control of the vehicle may be improved, causing the actual azimuth of the vehicle to more accurately follow the target azimuth.

It may be understood that in this embodiment, the manner of determining the current azimuth offset data reference value may be implemented adopting the flow shown in FIG. 4; or, it may also be determined based on a mean value of the current azimuth offset data included in the current azimuth offset data set.

Besides, the manner of determining a historical azimuth offset data reference value may be identical to or different from the manner of determining the current azimuth offset data reference value.

In some application scenarios, for example, the vehicle control parameter steering wheel rotary angle ω may be subjected to offset correction based on the offset between the current azimuth offset data reference value and the historical azimuth offset data reference value.

In these application scenarios, the current steering wheel rotational angle $\omega_0$ may be determined adopting a manner of incremental update.

Specifically, an offset Δe between the current azimuth offset data reference value $e_0$ and the historical azimuth offset data reference value $e_{-1}$ determined in the last execution of the calibrating step may be determined:

$$\Delta e = e_0 - e_{-1};$$

Next, the current steering wheel rotational angle $\omega_0$ may be computed through the following equation (3):

$$\omega_0 = \omega_{-1} + \beta \cdot \Delta e \qquad (3)$$

where $\omega_{-1}$ is the steering wheel rotational angle determined in the last execution of the calibrating step, and β is a preset constant.

The incremental update manner of determining the vehicle control parameter reduces the computational amount needed for updating the vehicle control parameter, thereby better satisfying the real time requirement on updating the control parameter.

It may be understood that, when implementing incremental update manner of determining the vehicle control parameter, the initial value of the vehicle control parameters is known. For example, when implementing incremental update manner of determining the steering wheel rotary angle, the initial value of the steering wheel rotary angle maybe preset as 0.

Figure 8:
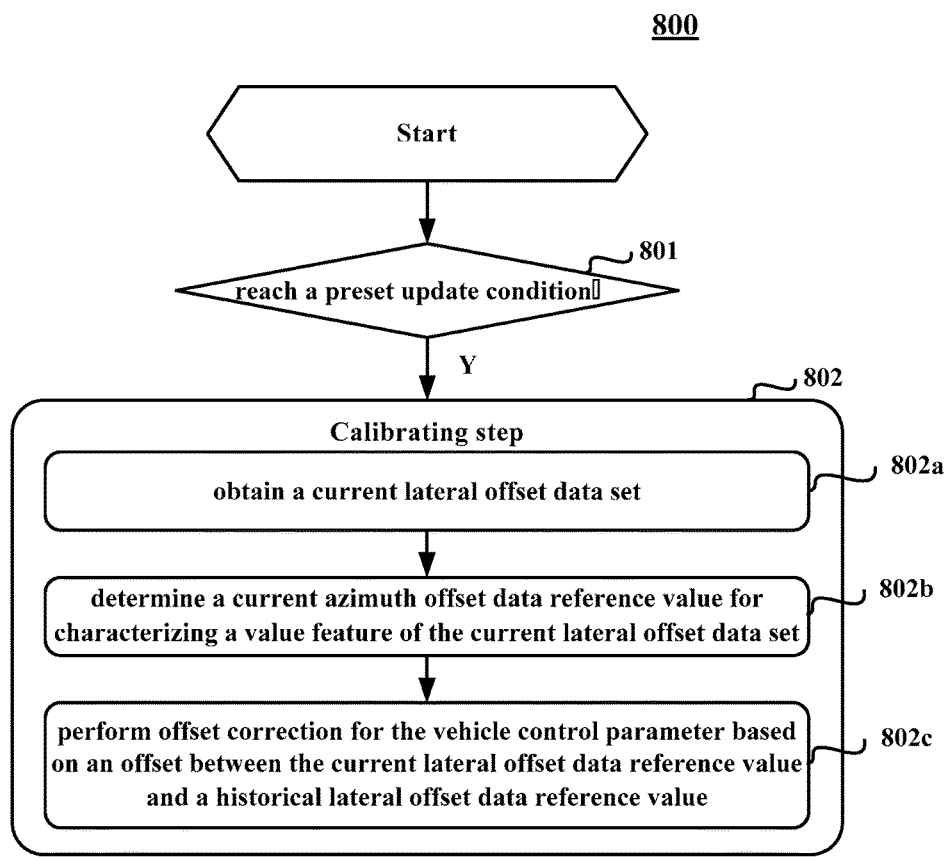
FIG. 8 is a flow chart of a further embodiment of a method for calibrating a vehicle control parameter according to the present disclosure.

Now, continue to refer to FIG. 8, which shows a flow chart 800 of a further embodiment of a method for calibrating a vehicle control parameter according to the present disclosure. In this embodiment, the offset data include a lateral offset amount. The flow 800 of the method for calibrating a vehicle control parameter comprises:

Step 801: executing a calibrating step 802 (as will be described infra) in response to reaching a preset update condition.

This step may be implemented in a manner similar to step 201 of the embodiment shown in FIG. 2, which will not be detailed here.

The calibrating step 802 may further comprise:

Step 802a: obtaining a current lateral offset data set, wherein the current lateral offset data in the current lateral offset data set are determined in a period of time including a current time point.

Step 802b: determining a current offset data reference value for characterizing a value feature of the current lateral offset data set.

Step 802c: performing offset correction for the vehicle control parameter based on an offset between the current lateral offset data reference value and a historical lateral offset data reference value.

Figure 9:
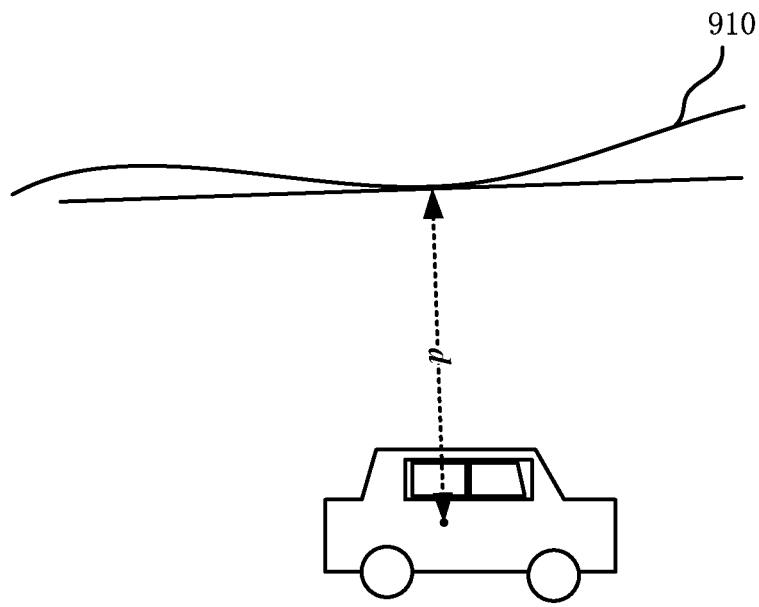
FIG. 9 is a schematic diagram of a lateral offset of a vehicle.

Referring to FIG. 9, the lateral offset amount of a vehicle may be understood as a distance between an actual position of the mass center of the vehicle and a vehicle planned trajectory 910, for example, the segment of distance illustrated by the symbol d.

In this embodiment, by performing offset correction to the vehicle control parameter based on the offset of the lateral offset amount, control accuracy for lateral control of the vehicle may be improved, causing the actual trajectory of the vehicle to more accurately follow the target trajectory.

It may be understood that in this embodiment, the manner of determining the current lateral offset data reference value may be implemented adopting the flow shown in FIG. 4; or, it may also be determined based on a mean value of the current lateral offset data included in the current lateral offset data set.

Besides, the manner of determining a historical lateral offset data reference value may be identical to or different from the manner of determining the current lateral offset data reference value.

In some application scenarios, for example, the vehicle control parameter steering wheel rotary angle ω may be subjected to offset correction based on the offset between the current lateral offset data reference value and the historical lateral offset data reference value.

In these application scenarios, the current steering wheel rotational angle $\omega_0$ may be determined adopting a manner of incremental update.

Specifically, an offset Δe' between the current lateral offset data reference value $e'_0$ and the historical lateral offset data reference value $e'_{-1}$ determined in the last execution of the calibrating step may be determined:

$$\Delta e' = e'_0 - e'_{-1};$$

Next, the current steering wheel rotational angle $\omega_0$ may be computed through the following equation (3):

$$\omega_0 = \omega_{-1} + \Delta e' \cdot \alpha \cdot 180/\pi \qquad (4)$$

where $\omega_{-1}$ is the steering wheel rotational angle determined in the last execution of the calibrating step, and α is a preset constant.

The incremental update manner of determining the vehicle control parameter reduces the computational amount needed for updating the vehicle control parameter, thereby better satisfying the real time requirement on updating the control parameter.

It may be understood that in some optional implementation manners, the offset data may not only include the azimuth offset amount in the embodiment shown in FIG. 6, but also may include the lateral offset amount in the embodiment shown in FIG. 8.

In these optional implementation manners, offset correction for the vehicle control parameter may be performed jointly based on the offset between the current azimuth offset data reference value and the historical azimuth offset data reference value and the offset between the current lateral offset data reference value and the historical lateral offset data reference value.

For example, when the to-be-calibrated vehicle control parameter is a steering wheel rotational angle, two current steering wheel rotational angles may be determined based on the equation (3) and the equation (4). Then, the final numerical value of the current steering wheel rotational angle may be obtained by solving the mean value or weighted mean value of the steering wheel rotational angles respectively determined through the equation (3) and the equation (4).

It may be understood that in some application scenarios of these optional implementation manners, after performing offset correction for the vehicle control parameter, the vehicle may be further subjected to steering control based on the offset-corrected vehicle control parameter, causing the generated control instruction to match the actual vehicle control parameter, thereby achieving a more accurate control effect, e.g., more accurately following the planned trajectory.

Figure 10:
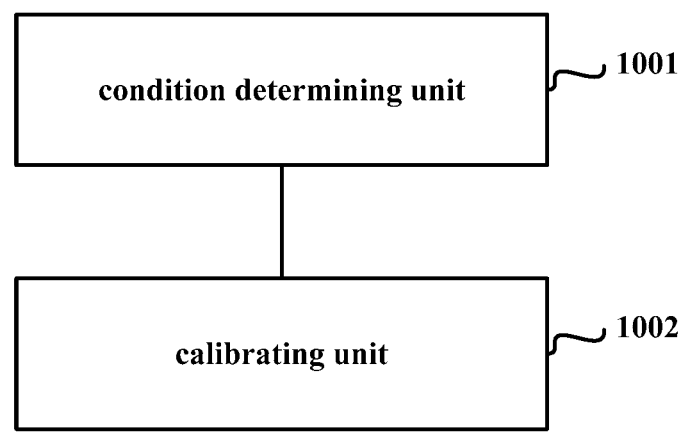
FIG. 10 is a structural diagram of an embodiment of an apparatus for calibrating a vehicle control parameter according to the present disclosure.

Further refer to FIG. 10. To implement the methods shown in respective drawings above, the present disclosure provides an embodiment of an apparatus for calibrating a vehicle control parameter. The apparatus embodiment corresponds to the method embodiment shown in FIG. 2. The apparatus may be specifically applied to various electronic devices.

As shown in FIG. 10, the apparatus for calibrating a vehicle control parameter comprises a condition determining unit 1001 and a calibrating unit 1002, wherein:

the condition determining unit 1001 may be configured for invoking the calibrating unit in response to reaching a preset update condition; and the calibrating unit 1002 may be configured for performing the calibrating step including:

obtaining a current offset data set, wherein the current offset data in the current offset data set are determined in a period of time including a current time point; determining a current offset data reference value for characterizing a value feature of the current offset data set; and performing offset correction for the vehicle control parameter based on an offset between the current offset data reference value and a historical offset data reference value.

In some optional implementation manners, the condition determining unit 1001 may be further configured for invoking the calibrating unit 1002 in response to the determined current offset data reference value exceeding a steady-state error of a control algorithm for controlling a vehicle.

In some optional implementation manners, the current offset data reference value may be determined by: selecting a candidate current offset data from the current offset data set; determining a range of numerical value based on the candidate current offset data; and determining the candidate current offset data as the current offset data reference value in response to determining that a percentage of the current offset data included in the range over the current offset data set exceeds a preset percentage threshold.

In some optional implementation manners of this embodiment, the current offset data reference value may also be determined based on a mean value of the current offset data included in the current offset data set.

In some optional implementation manners, the offset data may include an azimuth offset amount.

In these optional implementation manners, the azimuth offset amount refers to a difference between a target azimuth and an actual azimuth at a sampling time point of collecting the offset data.

In some optional implementation manners, the offset data may include a lateral offset amount.

In some optional implementation manners, the lateral offset amount refers to a distance between a vehicle body position and a vehicle target trajectory at a sampling time point of collecting the offset data.

In some embodiments, the apparatus may comprise: a steering control unit (not shown).

In these optional implementation manners, the steering control unit may be configured for performing steering control to a vehicle based on the offset-corrected vehicle control parameter.

Figure 11:
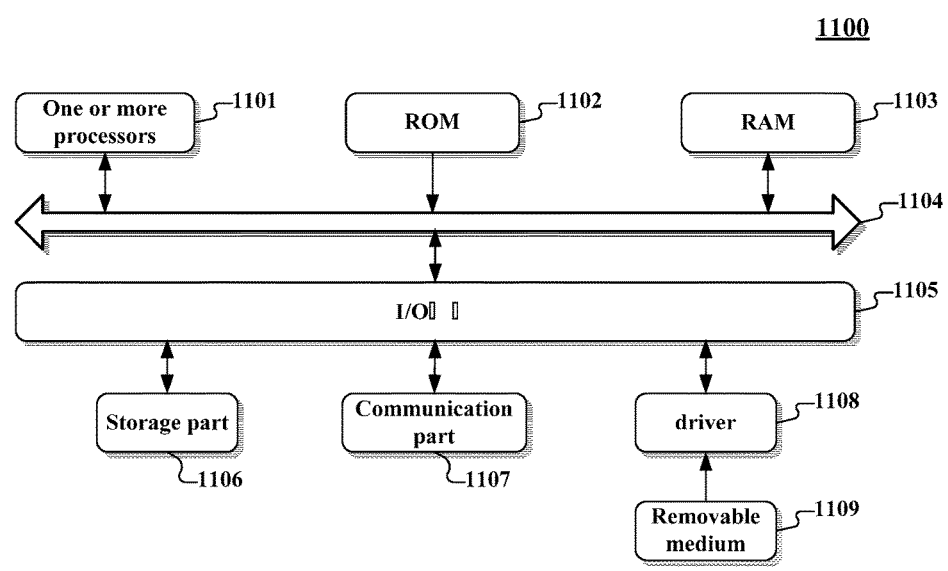
FIG. 11 is a structural schematic diagram of a computer system of an electronic device adapted for implementing a method for calibrating a vehicle control parameter according to the embodiments of the present disclosure.

Now refer to FIG. 11, which shows a structural schematic diagram of a computer system 1100 of an electronic device (e.g., an on-board controller) adapted for implementing a method for calibrating a vehicle control parameter according to the embodiments of the present disclosure. The electronic device shown in FIG. 11 is only an example, which should not constitute any limitation to the function and use scope of the embodiments of the present disclosure.

As shown in FIG. 11, the computer system 1100 comprises one or more processing units (e.g., CPU) 1101 which may perform various kinds of appropriate actions and processing according to computer program instructions stored in a read-only memory (ROM) 1102 or a program loaded into the random-access memory (RAM) 1103 from a memory part 1106. In RAM 1103, there may also store various kinds of programs and data needed for operations of the system 1100. CPU 1101, ROM 1102, and RAM 1103 are connected with each other via a bus 1104 The input/output (I/O) interface 1105 may also be connected to the bus 1104.

The following components are connected to the I/O interface 1105, including: a memory part 1106 including a hard disk, etc.; and a communication part 1107 including a network interface card such as a LAN (Local Area Network) card, a modem, etc. The communication part 1107 performs communication processing via a network such as the Internet. The driver 1108 is also connected to the I/O interface 1105 as needed. A removable medium 1109, such as a magnetic disk, an optical disk, a magneto-optical disk, and a semiconductor memory, etc., is mounted on the driver 1108 as needed, so as to facilitate the computer program read therefrom to be installed in the memory part 1106.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 1107, and/or installed from a removable medium 1109. When being executed by the central processing unit (CPU) 1101, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program codes are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program codes embodied on the computer-readable medium may be transmitted using any appropriate medium, including, but not limited to: wireless, wired, cable, RF, etc., or any appropriate combination thereof.

Computer readable program instructions for carrying out operations of the present invention may be compiled in one or more programming languages, the programming languages including object-oriented programming languages such as Java, Smalltalk, C++ or the like, as well as conventional procedural programming languages, such as the "C" programming language or similar programming languages. The computer codes may be executed entirely on the user's computer, partially on the user's computer, executed as a stand-alone software package, and partially on the user's computer and partially executed on a remote computer, or entirely executed on the remote computer or server. In a scenario involving a remote computer, the remote computer may be connected to the user's computer through any type of network, including a local area network (LAN) or a wide area network (WAN), or the connection may be made to an external computer (for example, through the Internet using an Internet Service Provider).

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks may be actually executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the embodiments of the present disclosure may be implemented by software or by hardware. The units as described may also be provided in a processor. For example, they may be described as: a processor comprising a condition determining unit and a calibrating unit. Particularly, names of these units do not constitute a limitation to the units per se in some circumstances. For example, the condition determining unit may also be described as "a unit for invoking a calibrating unit in response to reaching a preset update condition."

As another aspect, the present disclosure provides an autonomous vehicle, comprising an on-board controller described above. It may be understood that the autonomous vehicle may also include a sensing device such as IMU and a power device such as an engine, etc. These devices may all be implemented using the prior art, which will not be detailed here.

As another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: obtain a current offset data set, wherein the current offset data in the current offset data set are determined in a period of time including a current time point; determine a current offset data reference value for characterizing a value feature of the current offset data set; and perform offset correction for the vehicle control parameter based on an offset between the current offset data reference value and a historical offset data reference value.

What have been described above are only preferred embodiments of the present disclosure and an illustration of the technical principle as exploited. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for calibrating a vehicle control parameter, comprising:
   executing a calibrating step in response to reaching a preset update condition; wherein the calibrating step includes:
      obtaining a current offset data set, wherein current offset data in the current offset data set are determined in a period of time including a current time point;
      determining a current offset data reference value for characterizing a value feature of the current offset data set;
      performing offset correction for the vehicle control parameter based on an offset between the current offset data reference value and a historical offset data reference value; and
      performing steering control to a vehicle based on the offset-corrected vehicle control parameter, wherein the current offset data reference value is determined by:
         selecting a candidate current offset data from the current offset data set;
         determining a range of numerical value based on the candidate current offset data; and
         determining the candidate current offset data as the current offset data reference value in response to determining that a percentage of the current offset data included in the range over the current offset data set exceeds a preset percentage threshold.

2. The method according to claim 1, wherein the executing a calibrating step in response to reaching a preset update condition comprises:
   executing the calibrating step in response to the current offset data reference value exceeding a steady-state error of a control algorithm for controlling a vehicle.

3. The method according to claim 1, wherein the current offset data comprise an azimuth offset amount, the azimuth offset amount referring to a difference between a target azimuth and an actual azimuth at a sampling time point of collecting the current offset data.

4. The method according to claim 1, wherein the current offset data include a lateral offset amount, the lateral offset amount referring to a distance between a vehicle body position and a vehicle target trajectory at a sampling time point of collecting the current offset data.

5. An apparatus for calibrating a vehicle control parameter, comprising a condition determining unit and a calibrating unit,
wherein the condition determining unit configured for invoking the calibrating unit in response to reaching a preset update condition;
wherein the calibrating unit is configured for performing the calibrating step including:
obtaining a current offset data set, wherein current offset data in the current offset data set are determined in a period of time including a current time point;
determining a current offset data reference value for characterizing a value feature of the current offset data set;
performing offset correction for the vehicle control parameter based on an offset between the current offset data reference value and a historical offset data reference value; and
performing steering control to a vehicle based on the offset-corrected vehicle control parameter, wherein the current offset data reference value is determined by:
selecting a candidate current offset data from the current offset data set;
determining a range of numerical value based on the candidate current offset data; and
determining the candidate current offset data as the current offset data reference value in response to determining that a percentage of the current offset data included in the range over the current offset data set exceeds a preset percentage threshold.

6. An on-board controller, comprising:
one or more processors; and
storage means for storing one or more programs, wherein
when the one or more programs are executed by the one or more processors, the one or more processors are caused to:
execute a calibrating step in response to reaching a preset update condition; wherein the calibrating step includes:
obtaining a current offset data set, wherein current offset data in the current offset data set are determined in a period of time including a current time point;
determining a current offset data reference value for characterizing a value feature of the current offset data set;
performing offset correction for the vehicle control parameter based on an offset between the current offset data reference value and a historical offset data reference value; and
performing steering control to a vehicle based on the offset-corrected vehicle control parameter, wherein the current offset data reference value is determined by:
selecting a candidate current offset data from the current offset data set;
determining a range of numerical value based on the candidate current offset data; and
determining the candidate current offset data as the current offset data reference value in response to determining that a percentage of the current offset data included in the range over the current offset data set exceeds a preset percentage threshold.

7. An autonomous vehicle, comprising:
an on-board controller that comprises:
one or more processors; and
storage means for storing one or more programs, wherein
when the one or more programs are executed by the one or more processors, the one or more processors are caused to:
executing a calibrating step in response to reaching a preset update condition; wherein the calibrating step includes:
obtaining a current offset data set, wherein current offset data in the current offset data set are determined in a period of time including a current time point;
determining a current offset data reference value for characterizing a value feature of the current offset data set;
performing offset correction for the vehicle control parameter based on an offset between the current offset data reference value and a historical offset data reference value; and
performing steering control to a vehicle based on the offset-corrected vehicle control parameter, wherein the current offset data reference value is determined by:
selecting a candidate current offset data from the current offset data set;
determining a range of numerical value based on the candidate current offset data; and
determining the candidate current offset data as the current offset data reference value in response to determining that a percentage of the current offset data included in the range over the current offset data set exceeds a preset percentage threshold.

8. A non-transitory computer-readable memory medium on which a computer program is stored, wherein the program, when executed by a processor, causes the processor to:
execute a calibrating step in response to reaching a preset update condition; wherein the calibrating step includes:
obtaining a current offset data set, wherein current offset data in the current offset data set are determined in a period of time including a current time point;
determining a current offset data reference value for characterizing a value feature of the current offset data set;
performing offset correction for the vehicle control parameter based on an offset between the current offset data reference value and a historical offset data reference value; and
performing steering control to a vehicle based on the offset-corrected vehicle control parameter, wherein the current offset data reference value is determined by:

selecting a candidate current offset data from the current offset data set;

determining a range of numerical value based on the candidate current offset data; and determining the candidate current offset data as the current offset data reference value in response to determining that a percentage of the current offset data included in the range over the current offset data set exceeds a preset percentage threshold.

* * * * *